June 27, 1961   W. T. WATSON   2,990,214
COLLAPSIBLE CARAVANS
Filed Aug. 19, 1958   4 Sheets-Sheet 1
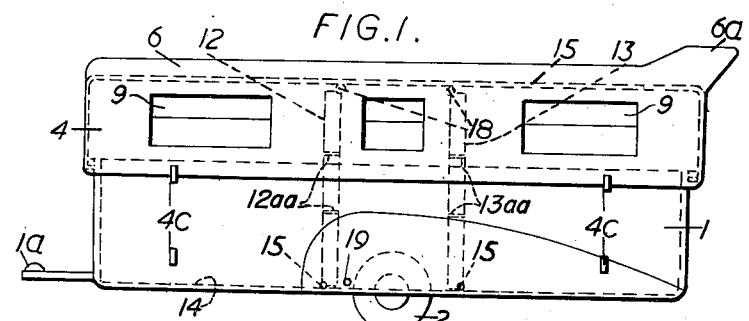
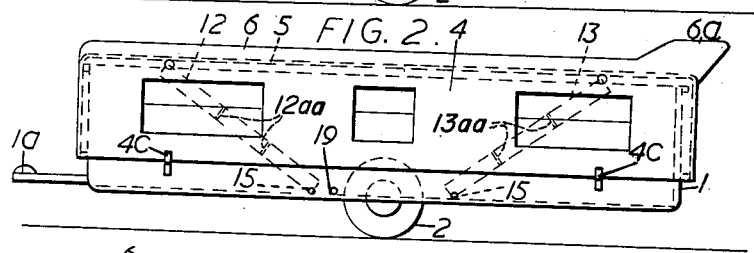
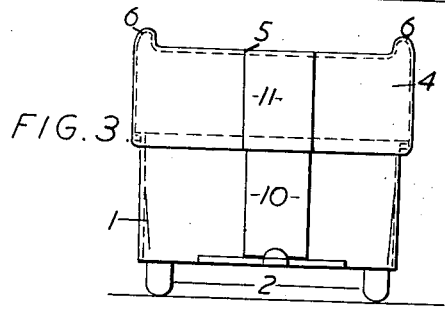
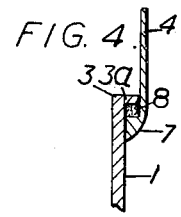
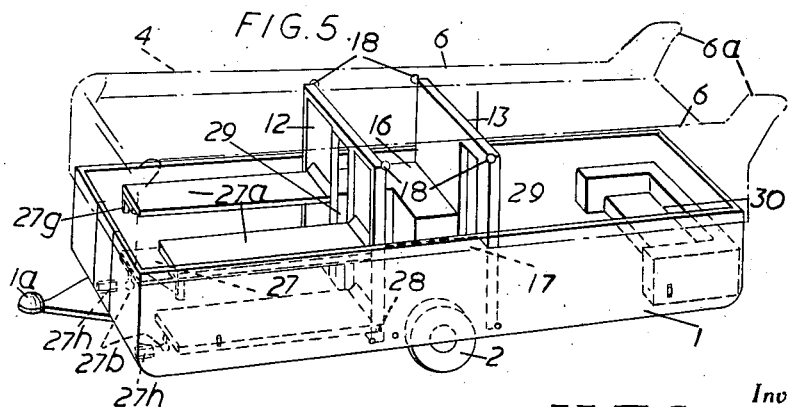
Inventor
W. T. Watson
By
Glascock Downing Seebold
Attorneys

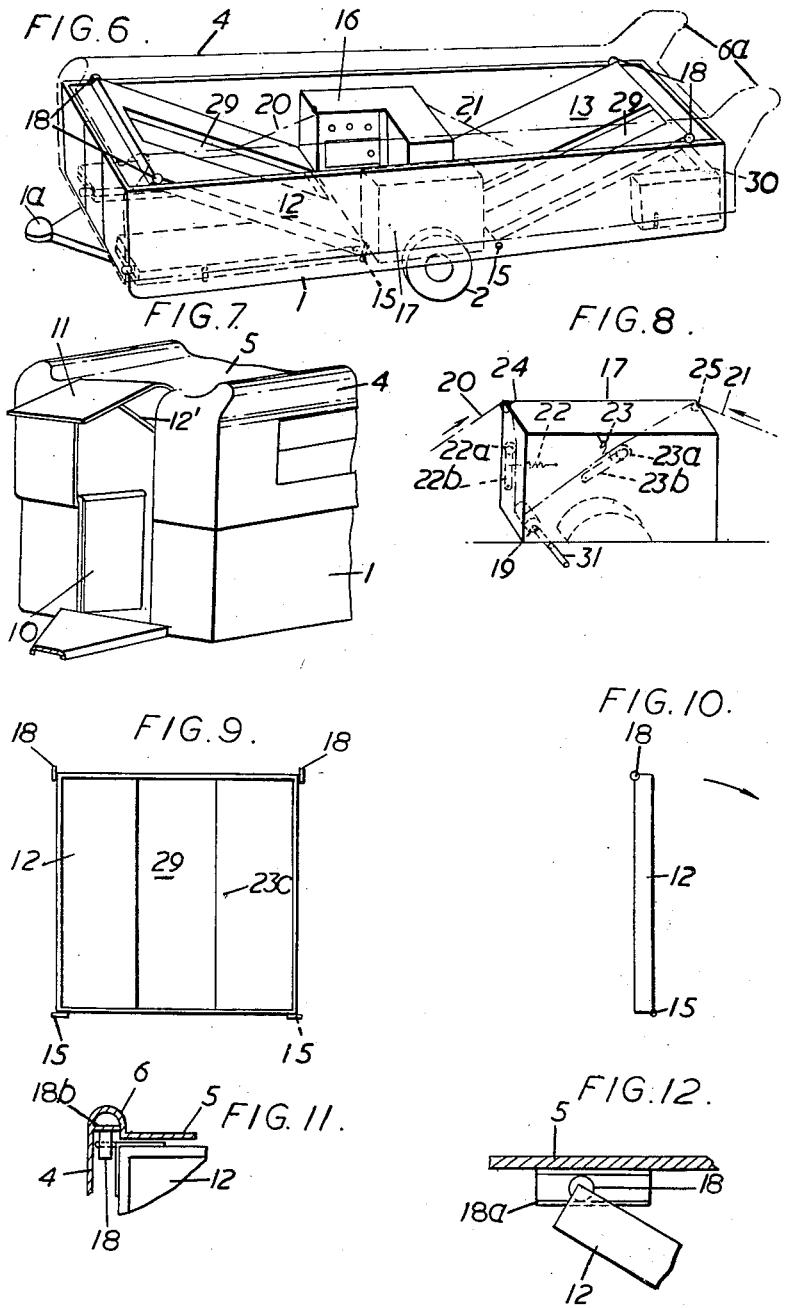

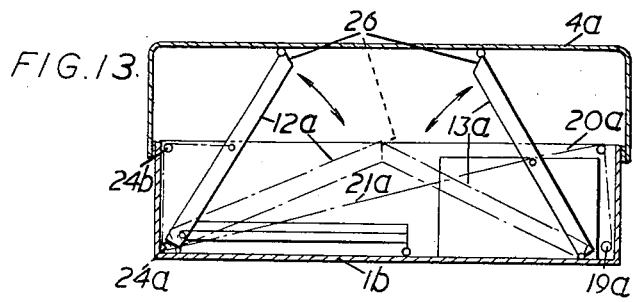
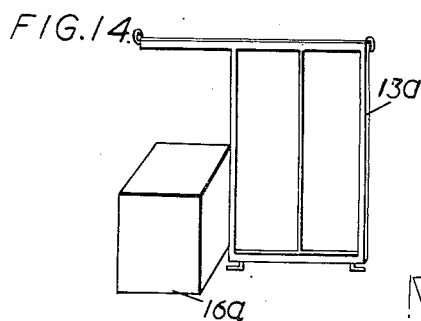
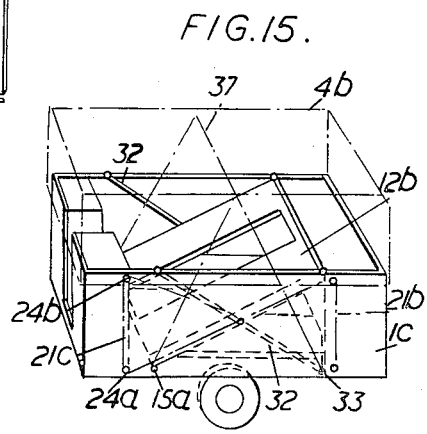
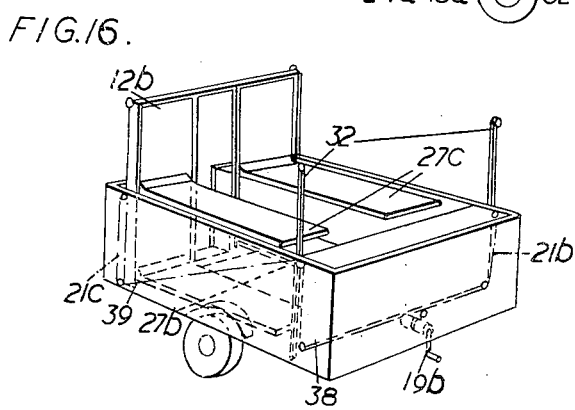

June 27, 1961 W. T. WATSON 2,990,214
COLLAPSIBLE CARAVANS
Filed Aug. 19, 1958 4 Sheets-Sheet 4
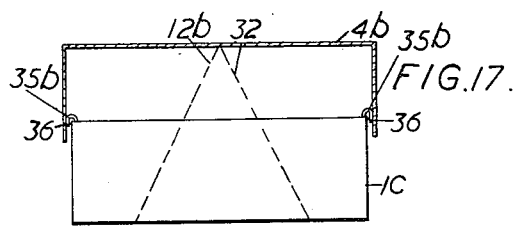
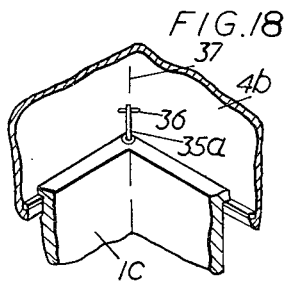
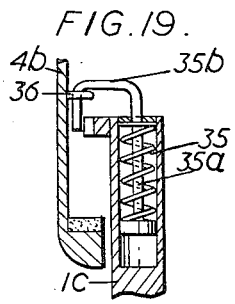
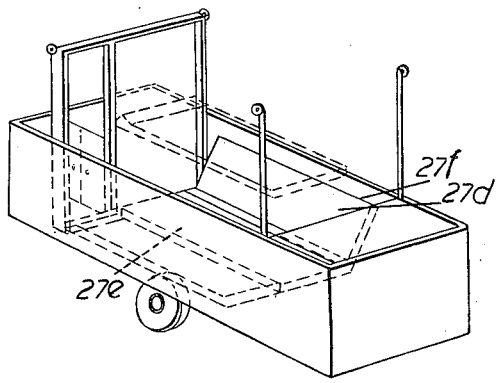
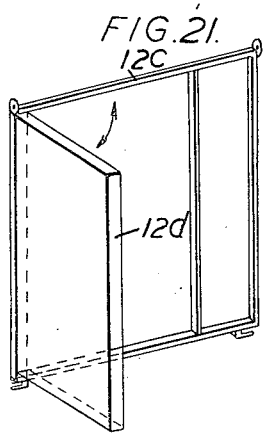
Inventor
W. T. Watson
By
Glascock Downing Leebold
Attorneys United States Patent Office 2,990,214
Patented June 27, 1961

2,990,214
COLLAPSIBLE CARAVANS
William Thirlaway Watson, 258 Rintoul St.,
Wellington, New Zealand
Filed Aug. 19, 1958, Ser. No. 756,029
Claims priority, application New Zealand Aug. 28, 1957
16 Claims. (Cl. 296—23)

This invention relates to caravans.

With present caravans, because of their height and width there is a considerable bulk which is disadvantageous as regards towing and also as regards the wind resistance of the caravan, causing a considerable increase in the towing power required, over the requirements for pulling the towed vehicle along the ground.

Various proposals have been made to produce what is commonly known as a collapsible caravan, but in all these proposals, because of the presence of loose or foldable pieces, aesthetic appeal is lacking and in addition the construction when erected gives an impression of impermanence and lack of neatness.

It is therefore an object of the present invention to obviate or minimise the above disadvantages by providing a caravan reducible in height for travelling yet adapted to be quickly and readily increased in height for living in at the end of a journey, the caravan being neat in appearance both when collapsed and when erected.

It is, therefore, an object of the present invention to obviate or minimise the above disadvantages by providing a caravan reducible in volume for travelling yet adapted to be readily increased in size for living in at the end of a journey.

Accordingly, the invention consists in a caravan, reducible in height for towing purposes, comprising a hull or shell having a lower section carrying the floor, ground wheels and towing means and which includes the lower part of each of the walls of the caravan, an upper section carrying the roof of the caravan and which includes the upper part of each of the walls of the caravan, said upper section being adapted to telescope downwardly over the lower section, and erecting means comprising a plurality of members pivotal on the floor and bearing on the roof or means associated with the upper section so that pivotal movement thereof in one direction causes raising of said upper section to a raised position ready for occupation of the caravan and movement in the opposite direction causes said upper section to be telescoped over said lower section to reduce the height of the caravan for towing purposes.

A preferred form of the invention and some modifications thereof will now be described with reference to the accompanying partly diagrammatic drawings, in which:

FIGURE 1 is a side elevation of the preferred form of the invention, the erecting means shown in dotted lines, and the roof being shown in the raised position, FIGURE 2 corresponds with FIGURE 1 but shows the roof and erecting means lowered, FIGURE 3 is an end elevation corresponding with FIGURE 1, FIGURE 4 is a fragmentary vertical section showing the junction between the upper and lower sections, FIGURE 5 is a pictorial view from an elevated plane showing the internal arrangement of the caravan, the roof being shown in broken outline and the parts being shown in the raised position, FIGURE 6 corresponds with FIGURE 5, but shows the parts in the lowered position, FIGURE 7 is a pictorial view of an end of the caravan showing the door therein, FIGURE 8 is a pictorial view of an internal housing showing the winch mechanism and other details, FIGURE 9 is an elevation of an erecting means employed in the construction shown in FIGURES 1 to 8 of the drawings, FIGURE 10 is a side elevation thereof, FIGURE 11 is an enlarged detail showing a method of mounting a roller on the same, FIGURE 12 is a detail showing how the upper section can be held down by the partitions, FIGURE 13 is a longitudinal section through an alternative form of the invention, the erecting means being disposed substantially at the ends of the caravan, FIGURE 14 is a pictorial view showing the erecting means of FIGURE 13 associated with an internal fixture of the caravan, FIGURE 15 is a pictorial view of a further alternative form of the invention, intended for use where the caravan is very short, the internal parts being shown in the lowered position, FIGURE 16 is a pictorial view of the form of the invention shown in FIGURE 15, showing the internal parts in the raised position, FIGURE 17 is a view showing the method of supporting or steadying the upper section when in the partly raised position, FIGURE 18 is a pictorial detail view showing one of the said means, in one position, FIGURE 19 is a pictorial detail view showing the said means in another position, FIGURE 20 is a pictorial view of an alternative form of the invention applicable to a narrow caravan, and FIGURE 21 is a pictorial view of a partition with a folding section therein.

In the preferred form of the invention shown in FIGURES 1 to 8, a lower section 1 of a caravan hull or shell including the floor is constructed from any suitable material and preferably a reinforced plastic material is used, reinforced with fibre-glass fibres, top hat sections or in any other known way. The lower section carries ground wheels 2 and the floor of the caravan. A towing hitch 1a is provided in the usual way. It is to be understood that the lower section 1 as with the remainder of the caravan is shaped in any suitable way, and, for example, the lower transverse edges and corners may be rounded, which is particularly efficacious in the case of a sheathed, wooden or plastic construction in order to give strength thereto as well as giving aesthetic appeal. The lower section of the caravan includes the lower part approximately one-half of the height of each of the walls of the shell and the upper edge 3 (FIGURE 4) thereof is shaped to an inverted J or L shape with the foot 3a of the J pointing outwardly as shown.

An upper section 4 including the roof 5 and the upper part, approximately half of the walls is provided moulded from reinforced plastic material. The roof is preferably something of a domed shaped as shown with longitudinal ribs 6 and fins 6a at the rear. Stops 4c preferably having any known type of catch as a toggle catch (not shown) are provided, and the upper section 4 has an inwardly turned J-shaped lower edge 7 (FIGURE 4) to coact with the inverted J-shaped edge 3a of the lower section through resilient e.g. sponge rubber facings 8.

Windows 9 are provided in the upper section.

One or more doors is provided to enable access to be gained to the interior of the caravan. Such doors may be provided in an end or side of the caravan, and may be provided in several different ways.

Preferably, each section is provided with a door in it substantially independent of the door in the remaining section, and for example, the lower or floor portion could be provided with a half door 10 (FIGURE 7) opening inwardly and in the roof section a door 11 opening outwardly and upwardly could be provided extending well into the line of the roof to provide in effect what is called a "gull wing" door. A stay 12' is provided to prop the door 11 open on springs provided in the hinges after the manner of those used for car boots. Alternatively a half door hinged on one side and opening outwardly could be provided.

Erecting means are provided in any one of the following ways. In FIGURES 1, 2, 5 and 6 the two erecting members each comprise partitions or inner walls 12 and 13 pivoted to the floor 14 of the caravan by pivots 15 disposed near their lower outer corners.

In general the partitions may be made of suitable thickness to permit them to include members 12aa and 13aa defining spaces to be used for storage spaces, e.g. wardrobes, cupboards, sets of shelves or other storage. The fixtures shown may comprise cooking and toilet sections, the latter equipped with wash hand basin.

In FIGURE 5 the partitions 12 and 13 are shown disposed on either side of permanent fixtures 16 and 17.

Alternatively as shown in FIGURE 13 partitions or walls 12a and 13a may be provided at either end of the caravan and as shown in FIGURE 14 a fixture 16a may be provided at the side of the wall 13a, the wall 13a being only partial in width as shown so that it clears the fixture 16a.

On the ends of the partitions 12 and 13 or 12a and 13a there are provided friction reducing means comprising wheels 18 (see FIG. 11) which bear on tracks provided on the underneath surface of the roof 5 of the caravan or means associated with the upper section 4. In the construction shown in FIGURES 1 to 12, raising and lowering means are provided to enable the partitions 12 and 13 to be raised and lowered in unison. As shown in FIGURE 8 the fixture 17 contains a hand operated winch 19 to which suitable cable means comprising cables 20 and 21 are connected and which in turn are connected to the partitions 12 and 13 respectively. Suitably anchored springs 22 and 23 are arranged at right angles to a run of each cable 20 and 21 so that when the cables 20 and 21 are under strain the springs are in tension, the said springs applying pressure to jockey pulleys 22a and 23a by which they apply tension to the cables. The jockey pulleys are on arms 22b and 23b. The purpose of this is to allow for slack to be taken up automatically on the cables when the partitions are moved slightly manually from the vertical position to unlock them ready for lowering the upper section as will be described shortly. The cables 20 and 21 are passed over suitable pulleys 24 and 25 as desired to connect them between the winch 19 and the partitions 12 and 13 to provide adequate leverage thereto. Similarly, in the construction shown in FIGURE 13 a winch 19 is provide, a cable 20a is connected between the wall 13a and the winch and a further cable 21a passes around pulleys 24a and 24b so as to exert the required pull on wall 12a.

In the construction shown in FIGURES 13 and 14, the edges 26 of the walls 12a and 13a are bevelled so that when the walls 12a and 13a are in a position shown dotted in FIGURE 13 the bevelled edges 26 rest against each other so that the walls 12a and 13a automatically support each other in this position.

The slight manual movement from one position to the other mentioned above must be repeated in the reverse direction to bring the partitions into the final upright positions. A suitable mark may be provided adjacent to the winch to indicate when the earlier position is reached from which the partitions must be moved manually. Also releasable locking means are provided to hold the partitions upright.

A bunk or bunks are provided one end of which is supported by a partition and bunks 27 and 27a are associated with the wall 12 (FIGURE 5), the upper bunk 27a being removable and being capable of being placed on the lower bunk 27 which is pivoted at 28 to the wall 12 so that when the wall 12 is moved to the folded position, shown in FIGURE 6, the lower bunk is moved forwardly to the position shown in FIGURE 6. The lower bunks are provided with wheeled feet 27b to provide for the movement of the bunks with movement of the partitions. The wheels may engage the floor or beneath guides or retaining means 27h when the caravan is collapsed, to prevent bouncing of the lower bunks during road travel. The outer ends of upper bunks 27a are supported on brackets 27g when erected while the inner ends are supported on the wall 12.

Doorways 29 and doors may be provided in the walls 12 and 13.

Referring to FIGURES 9 to 12, the partitions have the cables attached at 23c and the rollers 18 when the caravan is collapsed engage in guides 18a attached to the ceiling. Other furniture such as a couch 30 (which can be converted to a bed) may be provided as desired.

The use of the construction shown in FIGURES 1 to 12 above is as follows. It will be assumed that the caravan is in the erected position as shown in FIGURES 1 and 5 and that it is desired to lower the upper section 4 for travelling purposes. The bunks 27a are removed from their position and placed lying on top of the bunks 27. Other movable parts are stowed away as required and before leaving the caravan the user unlocks the releasable means, and pushes the top of each partition 12 and 13 outwardly a few inches away from the fixtures 16 and 17 between the partitions 12 and 13. The cables are tightened by this slight movement, and tension is applied to the springs 22 and 23 as shown in FIGURE 8. The weight of the partitions 12 and 13 is now taken on the winch 19 which has a ratchet device provided in any known way. The user then leaves the interior of the cabin and operates the winch by the handle 31 thereof which is accessible from outside the caravan and lowers the partitions by moving them away from each other until the rollers 18 rest on the lower section, with the upper section in the position shown in FIGURES 2 and 6. As the partitions 12 and 13 are lowered the wheels 18 run along the tracks 18b provided on the ceiling of the upper section 4 and because of its weight this upper section telescopes downwardly over the lower section 1 until it rests in the position shown in FIGURES 2 and 6.

Assuming the caravan to be in the folded suspension the partitions 12 and 13 are winched to the vertical position where they are held by catches provided, and then the winch is reversed two turns or so to allow the jockey pulleys 22a and 23a to take up slack provided by the reversing of the winch under the influence of the springs 22 and 23. This slack is necessary for the unlocking operation, as will be described further later. The winch is then locked in position. Alternatively, the partitions can be winched to near to the vertical position and the winch then locked, and then the partitions are pushed manually a few inches to the vertical position.

As regards the constructions shown in FIGURES 13 and 14, a similar procedure is adopted with the difference that the walls 12a and 13a are moved towards each other initially to unlock them from their locking position and they move farther towards each other during operation of the winch 19a until the faces 26 contact each other. In the same way, the upper section 4a telescopes downwardly over the lower section 1b.

The foregoing describes a construction suitable for use in a large caravan, for example sixteen or more feet in length.

It may be desirable, however, to use the invention in a small caravan such as that illustrated in FIGURES 15 and 16. In FIGURE 15 it will be seen that the erecting means comprise one inner wall 12b pivoted at 15a towards one end of the caravan and two outer members 32 pivoted to the floor of the caravan at 33 towards the opposite end of the caravan to the pivots 15a. The partition 12b is narrower in width than the width of the caravan for a distance such as to allow a space or clearance down each side so that the members 32 may cross the partition 12b. A winch 19b accessible from outside is provided and connecting cables 21b connect the winch to the members 32 and further cables 21c connect the members 32 through pulleys 24a and 24b to the partition 12b. The operation of the co-relating cable means is the same as above described with reference to FIGURE 13. The difference between the construction in FIGURES 13 and 14 and FIGURES 15 and 16, however, lies in the fact that in FIGURE 13 the members 12a and 13a abut in end to end relationship, while in FIGURES 15 and 16 the members 12b and 32 pass each other, or overlap each other when they are moved downwards during lowering of the upper section 4b.

To assist in preventing tilting during the final stages of erection of the upper section 4b, spring means 35 (see FIGURES 18 and 19) are provided in each corner 4 of the lower section 1c, these springs 35 acting on a stem 35a and hook 35b which hook engages a staple 36 on the corner 37 of the upper section 4b of the caravan. It will be appreciated that since the partition 12b and the members 32 will only support the upper section 4b along a line 37 shown dotted in FIGURE 15 there will be a tendency for the upper section to waver on reaching this point. Accordingly the springs 35 are arranged to engage the staples 36 from just before this point onwardly, thus tending to give a steadying effect to the raising of the upper section 4b. In the construction shown in FIGURES 15 and 16, bunks 27b and 27c are provided in a similar manner to those provided in the construction provided in FIGURES 1 to 12. In a construction such as this a caravan could be constructed having a length of only eight feet overall and with an interior height of six feet two inches when raised, the overall height of the caravan when lowered need only be approximately three feet six inches. It will be understood that when the bunk 27b with the bunk 27c thereupon is positioned with the wall 12b in the folded position the bunk will be moved rearwardly and provision must be made for this in designing the caravan, thus the bunk 27b could either extend into the space 38 provided at the free end or alternatively the bunk could be fixed at this end and resting on a roller at 39 in the wall 12b which roller slides along the under surface of the bunk when raising and lowering.

It is also to be understood that the bunks may be positioned as shown in FIGURE 20 which shows a construction suitable for a very narrow caravan, so as to provide a back for a sofa 27d made up of a bunk 27e as the seat thereof and a bunk 27f as the back thereof. The bunk 27f may be either a top bunk or part of a double bunk or bed at the lower level.

FIGURE 21 shows a partition or wall erecting means 12c with a panel 12d which swings from a position in the plane of the partition or wall to the position shown at right angles thereto and out of the way of the caravan interior. The panel may be a storage panel.

Referring to FIGURE 2, the upper section may be locked in place for towing by the use of snap fasteners or other means at 4c.

It is to be noted that when the caravan is to be used in the daytime, the lower bunks may be pivoted upwardly so as to lie and be held close to or within the partition with the upper bunks preferably held in place thereby.

What I claim is:

1. A caravan, reducible in height for towing purposes, comprising a hull or shell having a lower section carrying the floor, ground wheels and towing means and which includes the lower part of each of the walls of the caravan; an upper section carrying the roof of the caravan and which includes the upper part of each of the walls of the caravan, said upper section being adapted to telescope downwardly over the lower section; and erecting means including a plurality of interiorly positioned partition members pivotal on the floor and bearing against the upper section so that pivotal movement thereof in one direction causes raising of said upper section to a raised position ready for occupation of the caravan and movement in the opposite direction allows said upper section to be telescoped over said lower section to reduce the height of the caravan for towing purposes.

2. A caravan as claimed in claim 1 wherein said partitions are of substantial thickness and have members defining spaces therein, said spaces being usable for storage purposes.

3. A caravan as claimed in claim 2 wherein a panel having auxiliary storage space therein is pivotally secured to one of said partitions along a vertical axis and is swingable to a plane at right angles to the plane of said partition to provide auxiliary support for said upper section.

4. A caravan as claimed in claim 1 wherein at least one of said partitions carries at least one bunk one end of which is pivotally connected to said one of said partitions, the other end of said one bunk being swingable from a vertical position within said partition to a horizontal position interiorly of said caravan.

5. A caravan as claimed in claim 4 wherein an upper bunk is provided above said one bunk and the upper bunk is removable for placement on said one bunk when it is desired to lower said upper section for towing purposes.

6. A caravan as claimed in claim 5, wherein a lower part of said one bunk is provided with a roller so that on said partition being moved during raising and lowering of said upper section said roller rolls on the floor.

7. A caravan, reducible in height for towing purposes, comprising a hull or shell having a lower section carrying the floor, ground wheels and towing means and which includes the lower part of each of the walls of the caravan; an upper section carrying the roof of the caravan and which includes the upper part of each of the walls of the caravan, said upper section being adapted to telescope downwardly over the lower section; and erecting means including an interiorly positioned partition member pivotal on the floor and bearing against the upper section, and additional erecting members comprising two outer members disposed one on each side of a longitudinal line running along the caravan so that pivotal movement of said partition and said additional members in one direction causes raising of said upper section to a raised position ready for occupation of the caravan, and movement in the opposite direction allows said upper section to be telescoped over said lower section to reduce the height of the caravan.

8. A caravan as claimed in claim 7 wherein said two outer members and said partition cross during raising and lowering and wherein said partition is narrower in width than the width of the caravan by a distance such as to provide spaces on either side thereof within which said two outer members may move.

9. A caravan as claimed in claim 8 wherein spring means are provided in the corners of the lower section engageable with hook means provided on the inner sides of the corners of the upper section so that when said section is raised to a certain position said spring means engage said hook means to stabilise said upper section and minimise tilting during raising.

10. A caravan as claimed in claim 1, wherein said partitions are arranged one on either side of the centre of the upper section of the caravan and are arranged so that during lowering of the upper section the upper ends of said partitions move away from each other.

11. A caravan as claimed in claim 1 wherein said partitions are arranged towards either end of said caravan and are arranged so that during lowering their upper ends move towards each other.

12. A caravan as claimed in claim 1 wherein winch means accessible from outside the caravan are provided and cable means connect said winch means to said erecting means so that said erecting members may be raised and lowered by operation of said winch means.

13. A caravan as claimed in claim 12 wherein spring means are provided to minimize slack in said cable means when said erecting means are moved manually a short distance to the fully erected position for locking and unlocking purposes.

14. A caravan as claimed in claim 1 wherein the upper ends of said erecting members are provided with friction reducing wheels running in tracks associated with the upper section.

15. A caravan as claimed in claim 1 wherein at least said upper section is constructed of fibre glass reinforced plastic material.

16. A caravan as claimed in claim 1 wherein th engaging edges of said upper and lower sections are L shaped and are provided with a resilient surface.

References Cited in the file of this patent

UNITED STATES PATENTS

| | | |
|---|---|---|
| 2,055,930 | Josephs | Sept. 29, 1936 |
| 2,076,486 | Watt | Apr. 6, 1937 |
| 2,168,062 | Davey | Aug. 1, 1939 |
| 2,298,619 | Gorton | Oct. 13, 1942 |
| 2,561,921 | Guillot | July 24, 1951 |
| 2,837,778 | Kern | June 10, 1958 |
| 2,843,418 | Gray | July 15, 1958 |
| 2,879,103 | Hall | Mar. 24, 1959 |